US011989181B2

(12) United States Patent
Cisek et al.

(10) Patent No.: US 11,989,181 B2
(45) Date of Patent: *May 21, 2024

(54) OPTIMAL QUERY SCHEDULING FOR RESOURCE UTILIZATION OPTIMIZATION

(71) Applicant: Google LLC, Mountain View, CA (US)

(72) Inventors: Julius Cisek, Alameda, CA (US); Gaurav Kumar, Berkeley, CA (US); Shaunak Mistry, Scotts Valley, CA (US); Kalen Petersen, Olympia, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,726

(22) Filed: Mar. 2, 2023

(65) Prior Publication Data

US 2023/0205772 A1   Jun. 29, 2023

Related U.S. Application Data

(63) Continuation of application No. 17/457,450, filed on Dec. 3, 2021, now Pat. No. 11,625,400, which is a
(Continued)

(51) Int. Cl.
*G06F 16/245* (2019.01)
*G06F 16/2453* (2019.01)

(52) U.S. Cl.
CPC .............. *G06F 16/24545* (2019.01)

(58) Field of Classification Search
CPC .................................. G06F 16/24545
See application file for complete search history.

(56) References Cited

U.S. PATENT DOCUMENTS

| 5,687,362 A | 11/1997 | Bhargava et al. |
| 2003/0212668 A1 | 11/2003 | Hinshaw et al. |

(Continued)

FOREIGN PATENT DOCUMENTS

| WO | 2012050913 A1 | 4/2012 |
| WO | 2013160721 A1 | 10/2013 |

OTHER PUBLICATIONS

Preliminary Search Report & Written Opinion, Application No. FR2000264, dated Oct. 15, 2020, 9 pages.
(Continued)

*Primary Examiner* — Baoquoc N To
(74) *Attorney, Agent, or Firm* — Honigman LLP; Brett A. Krueger

(57) ABSTRACT

The present disclosure provides a method, system and computer program product for optimal query scheduling for resource utilization option. In an embodiment of the disclosure, a process for optimal query scheduling includes receiving in an information retrieval data processing system at a contemporaneous time, a request for deferred query execution of a specified query to a future time after the contemporaneous time. The method additionally includes determining a frequency of change of data corresponding to a field referenced in the specified query. Then, on condition that the frequency of change is below a threshold value, an intermediate time prior to the future time but after the contemporaneous time can be identified and the specified query scheduled for execution at the intermediate time instead of the future time. But, otherwise the specified query can be scheduled at the future time as originally requested.

20 Claims, 3 Drawing Sheets

Related U.S. Application Data continuation of application No. 16/741,723, filed on Jan. 13, 2020, now Pat. No. 11,204,922.

(56) References Cited

U.S. PATENT DOCUMENTS

| | | |
|---|---|---|
| 2009/0281987 A1 | 11/2009 | Krishnamoorthy et al. |
| 2011/0112759 A1 | 5/2011 | Bast et al. |
| 2011/0228668 A1 | 9/2011 | Pillai et al. |
| 2013/0024442 A1 | 1/2013 | Santosuosso et al. |
| 2016/0203422 A1 | 7/2016 | Demarchi et al. |
| 2018/0268003 A1* | 9/2018 | Barsness ........... G06F 16/24568 |
| 2018/0349458 A1* | 12/2018 | Guirguis ............... G06F 16/273 |

OTHER PUBLICATIONS

CNIPA. Office Action relating to Application No. 202180008997.3, dated Oct. 11, 2022.
USPTO. Office Action relating to U.S. Appl. No. 17/457,450, dated Oct. 12, 2022.

* cited by examiner

OPTIMAL QUERY SCHEDULING FOR RESOURCE UTILIZATION OPTIMIZATION

CROSS REFERENCE TO RELATED APPLICATIONS

This U.S. patent application is a continuation of, and claims priority under 35 U.S.C. § 120 from, U.S. patent application Ser. No. 17/457,450, filed on Dec. 3, 2021, which is a continuation of U.S. patent application Ser. No. 16/741,723, filed on Jan. 13, 2020. The disclosures of these prior applications are considered part of the disclosure of this application and are hereby incorporated by reference in their entireties.

TECHNICAL FIELD

This disclosure relates to optimal query scheduling for resource utilization optimization.

BACKGROUND

A query is a request for information from an information retrieval system. There are three general methods for posing queries: menu driven, querying by example and query language formulation. In the first instance, a query is formulated and issued based upon the selection of parameters in a menu. In the second instance, the information retrieval system presents a blank record and allows the end user to specify the fields and values that define the query. In the third instance, the end user formulates the query utilizing a stylized query written in a query language. The latter is the most complex method because it requires the use of a specialized language, but the latter is also the most powerful as it is the least constrained mode of querying an information retrieval system.

Queries generally are issued either on demand through a query interface, or programmatically at the time of executing a computer program. But, queries also may be issued in batch mode. That is to say, a query may be specified at one time, but execution of the query against the information retrieval system may be deferred to a later time. In this regard, in an information retrieval system, it is common for multiple users to concurrently submit queries to the database for execution. Consequently, if the information retrieval system lacks sufficient computing resources to execute all of the submitted queries simultaneously, the information retrieval system must defer execution of one or more of those queries while only a subset of the queries may be processed immediately. The process of determining which queries to defer and at what time the deferred queries are to execute is known as query scheduling.

One way to perform query scheduling is to execute incoming queries in the order they arrive referred to as a "first-come-first-serve" approach. However, the first-come-first serve approach cannot differentiate between queries that have differing response time requirements, some queries being more time sensitive than others. If queries are simply scheduled according to order of arrival, some time-sensitive queries may be forced to wait behind time-insensitive queries, which can adversely affect the usability and responsiveness of the information retrieval system.

Query scheduling also may be performed according to fixed priority. In fixed priority scheduling, each query is assigned a priority based on one or more properties known at the time of query arrival such as the identity or type of the query requestor. Thereafter, each query may be scheduled according to an assigned priority. As can be seen, fixed priority scheduling avoids the problems of the first-come-first-serve approach since time-sensitive queries can be prioritized over less time-sensitive queries. Yet, fixed priority scheduling cannot account for "heavy" queries that take a relatively long time to execute and "light" queries that take a relatively short time to execute, such as on the order of milliseconds or seconds.

SUMMARY

Embodiments of the present disclosure address deficiencies of the art in respect to query scheduling and provide a novel and non-obvious method, system and computer program product for optimal query scheduling for resource utilization option. In an embodiment of the disclosure, a process for optimal query scheduling includes receiving in an information retrieval data processing system at a contemporaneous time, a request for deferred query execution of a specified query to a future time after the contemporaneous time. The method additionally includes determining a frequency of change of data corresponding to a field referenced in the specified query. Then, on condition that the frequency of change is below a threshold value, an intermediate time prior to the future time but after the contemporaneous time can be identified and the specified query scheduled for execution at the intermediate time instead of the future time. But, otherwise the specified query can be scheduled at the future time as originally requested.

In one aspect of the embodiment, the intermediate time is identified by locating a time that is under-scheduled with fewer scheduled queries consuming fewer resources of the information retrieval data processing system than available resources of the information retrieval data processing system at the located time and that has enough of the available resources to support execution of the specified query. In another aspect of the embodiment, a multiplicity of requests are received for the scheduling of several different queries at the future time and an estimated cost of execution computed for each of the different queries. For instance, the estimated cost of execution for each of the different queries may be computed by matching at least a portion of each of the different queries to an entry in a table of queries fragments and corresponding historical execution times.

Then, the different queries can be filtered to a subset, each with a corresponding estimated cost of execution that exceeds a threshold value. Alternatively, the different queries may be filtered to a subset of queries each with a corresponding estimated cost of execution that falls short of a threshold value. Finally, it can be determined for each corresponding one of the queries in the subset, a frequency of change of data corresponding to a field referenced in the corresponding one of the queries in the subset. As such, for each corresponding one of the queries in the subset, on condition that the frequency of change of the corresponding one of the queries in the subset is below a threshold value, the intermediate time prior to the future time but after the contemporaneous time can be identified and the corresponding one of the queries in the subset scheduled for execution at the intermediate time.

In another embodiment of the disclosure, an information retrieval data processing system is adapted for optimal query scheduling. The system includes a host computing platform having one or more computers each with memory and at least one processor. The system further includes a query interface coupled to a database. The query interface receives from requesters from over a computer communications network, requests to schedule queries against the database, and in response, schedules the queries for execution so as to return different results sets to the requesters. Finally, the system includes an optimal query scheduling module.

The module includes computer program instructions that when executing in the memory of the host computing platform, are operable to receive at a contemporaneous time, a request for deferred query execution of a specified query to a future time after the contemporaneous time and to determine a frequency of change of data corresponding to a field referenced in the specified query. The instructions are further operable to identify an intermediate time prior to the future time but after the contemporaneous time, and schedule the specified query for execution at the intermediate time instead of the future time, on the condition that the frequency of change is below a threshold value, But otherwise, the program instructions are operable simply to schedule the specified query at the future time.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION OF DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

DETAILED DESCRIPTION

Embodiments of the disclosure provide for the optimal query scheduling of one or more queries in an information retrieval data processing system. In accordance with an embodiment of the disclosure, different requests are received at a contemporaneous time in an information retrieval system requesting the deferral of execution of respective queries to a future time. Ones of the queries are then processed to identify implicated fields therein, and a volatility of change of the fields are determined. To the extent that it is determined that a query amongst the queries has a field determined to have a volatility beyond an acceptable threshold level, the request for deferral for that query is honored and the query is scheduled at the future time. But, to the extent that it is determined that a query amongst the queries has a field determined not to have a volatility beyond the acceptable threshold level, the request for deferral is modified to a time that is intermediate to the contemporaneous time and the future time, so as to reduce the execution load of queries at the future time.

Figure 1:
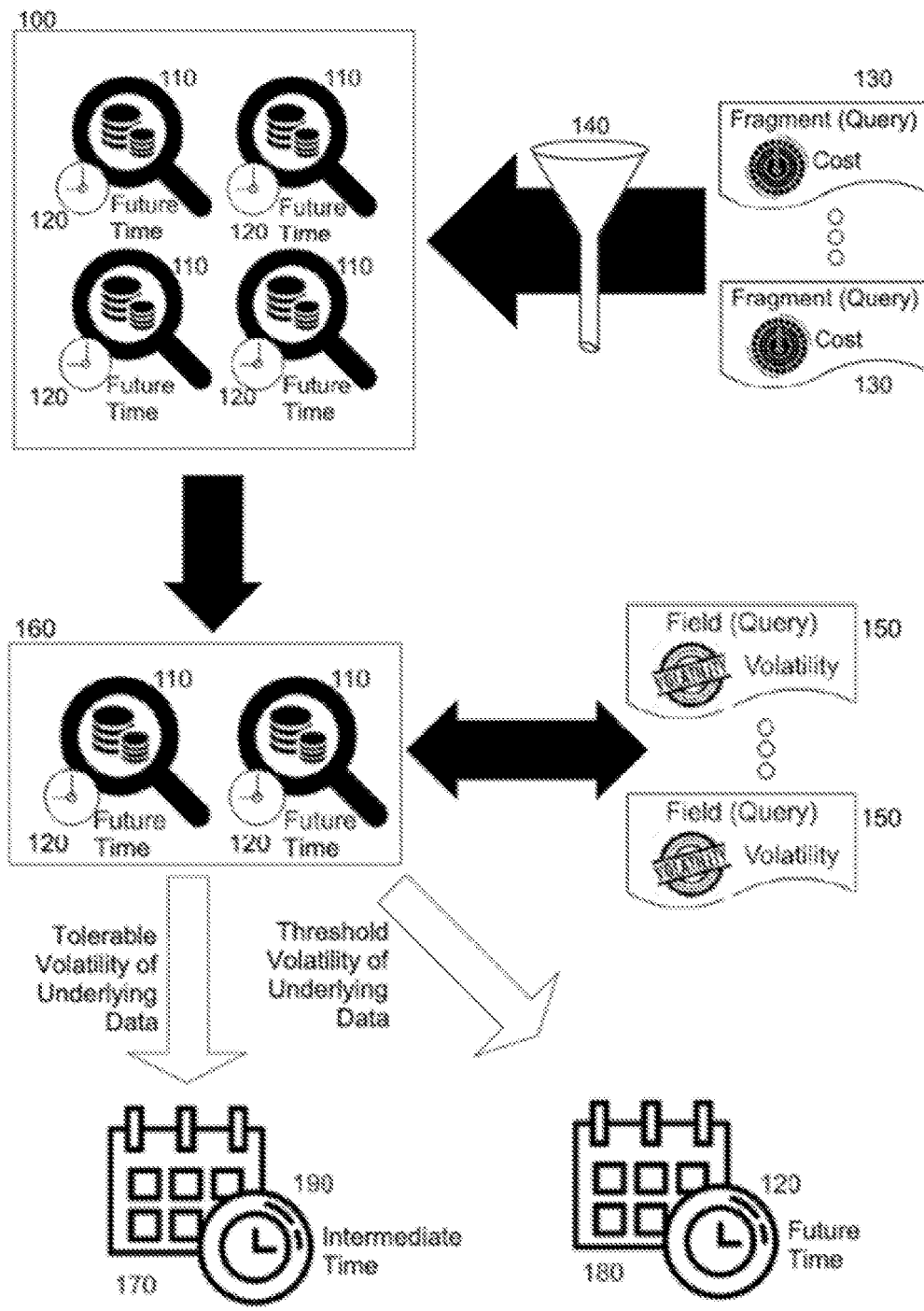
FIG. 1 is pictorial illustration of a process for optimal query scheduling for an information retrieval data processing system.

In further illustration of an exemplary embodiment of the disclosure, FIG. 1 pictorially shows a process for optimal query scheduling for an information retrieval data processing system. As shown in FIG. 1, a set of requests 110 are received in the information retrieval data processing system, each of the requests 110 seeking to defer scheduling of a corresponding query of a database to a future time 120. Optionally, a portion of each query is selected and compared to a data structure of execution costs 130 associated with different query portions in order to match the selected portion to an entry in the data structure indicating a likely execution cost of the selected query. A filter 140 is then applied to the set of requests to produce a subset 160 of the query requests 110 with associated execution costs 130 that are significant enough to warrant optimization.

Each of the requests 110 in the subset 160 are then tested for data volatility. Specifically, for each corresponding one of the requests 110 in the subset 160, a field associated with a query of the corresponding one of the requests 110 is matched to a data structure indicating a known volatility 150 of different fields of the database—namely, for each field, how often the underlying data changes. Once matched, the determined volatility 150 for a field of an associated query is compared to a specified threshold and for ones of the requests 110 in the subset 160 that have a volatility beyond the threshold, the corresponding one of the queries is assigned to a schedule 180 as requested at the future time 120. But, for ones of the requests 110 in the subset 160 that have a volatility below the threshold, the corresponding one of the queries is assigned to a schedule 190 at an intermediate time 170 prior to the future time 120. In this regard, the intermediate time 170 may be selected in accordance with a predicted availability of computing resources accessible by the information retrieval system at that time and a perceived excess capacity of the computing resources during that time to process additional queries.

Figure 2:
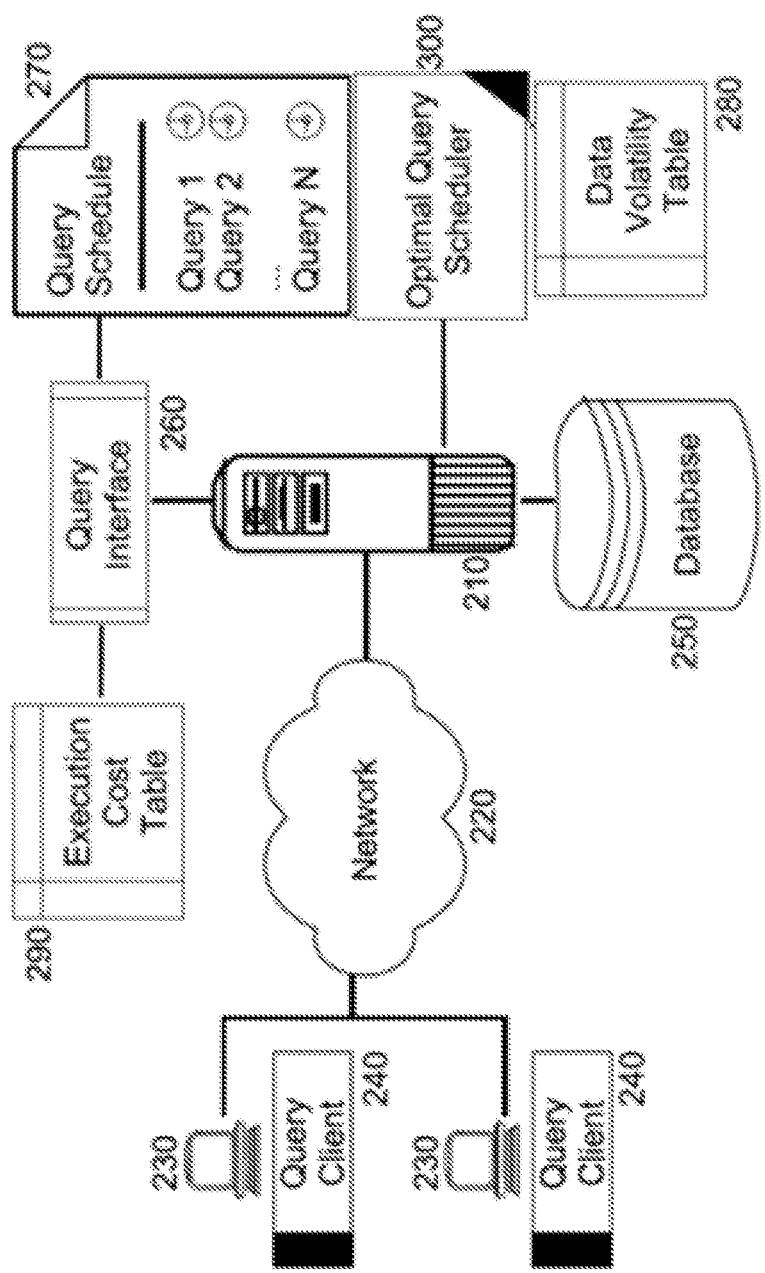
FIG. 2 is a schematic illustration of an information retrieval data processing system configured for optimal query scheduling; and, FIG. 3 is a flow chart illustrating a process for optimal query scheduling for an information retrieval data processing system.

The process described in connection with FIG. 1 can be implemented within an information retrieval data processing system. In further illustration, FIG. 2 schematically shows an information retrieval data processing system configured for optimal query scheduling. The system includes a host computing platform 210 that includes one or more computers, each with memory and at least one processor. The system also includes a query interface 260 to a database 250 (or a data model modeling data in the database 250). The query interface 260 is configured to receive queries from over computer communications network 220 from query clients 240 executing in respectively different computing devices 230, and to schedule the execution of each of the received queries in a query schedule 270, with each of the queries being assigned a specific time (day/date/time or any combination thereof) for execution. The query interface 260 further is configured to provide to requesting ones of the query clients 240, corresponding results for submitted and executed queries.

Of importance, the system includes an optimal query scheduler module 300. The module 300 includes computer program instructions which when executed in the host computing platform 210, are enabled to receive from the query clients 240, individual requests to defer the execution of a specified query to a future time. The computer program instructions additionally are enabled upon execution to consult an execution cost table 290 correlating different query portions to known execution costs in order to identify an entry in the table 290 matching a portion of the specified query so as to predict an execution cost of the specified query.

The computer program instructions are further enabled during execution, to the extent that the predicted execution cost exceeds a threshold value, to identify a field implicated by the specified query and determine in a data volatility table 280 a known volatility of data for the identified field. Finally, the computer program instructions are enabled during execution to select an intermediate time before the future time for scheduling the specified query in the query schedule 270 so long as the determined volatility for the specified query is below the threshold value. But otherwise, the computer program instructions are enabled to honor the request for deferral by scheduling the specified query in the query schedule 270 at the future time.

Figure 3:
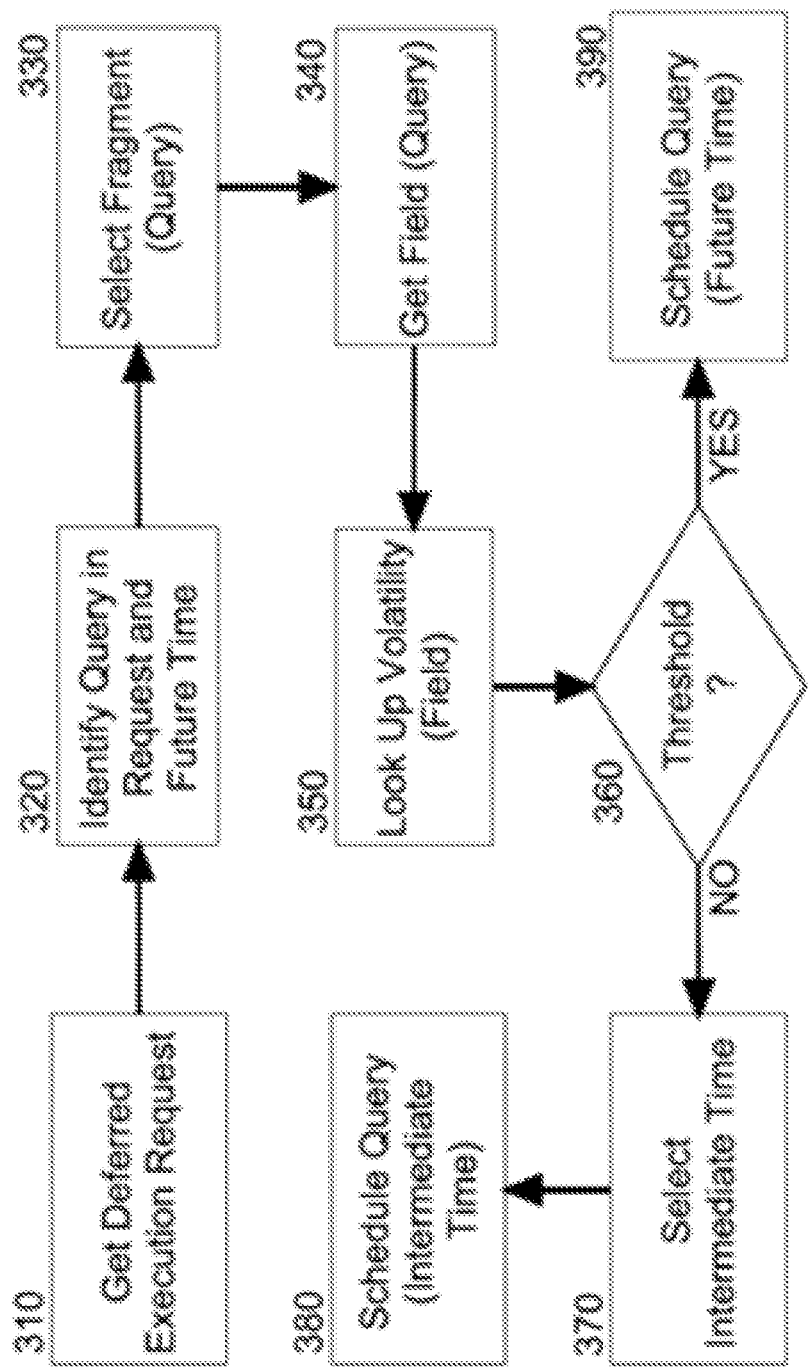

In even yet further illustration of the operation of the optimal query scheduler module 300, FIG. 3 is a flow chart illustrating a process for optimal query scheduling for an information retrieval data processing system. Beginning in block 310, a request to defer a specified query to a future time is received and in block 320, the specified query is identified in the request along with the future time. Then, in block 330, a portion of the specified query is selected and in block 340, a field in the database or data model implicated by the specified query is identified. In block 350, a volatility of the field is retrieved. Thereafter, in decision block 360 it is determined if the retrieved volatility exceeds a threshold value. If not, an intermediate time before the future time during which the processing resources of the information retrieval system demonstrate an excess capacity is selected in block 370. Consequently, in block 380 the specified query is scheduled for execution at the intermediate time. But otherwise, in block 390 the specified query is scheduled for execution at the future time.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method when executed on data processing hardware causes the data processing hardware to perform operations comprising:
   receiving a plurality of requests to schedule execution of a corresponding plurality of queries at a future time;
   for each respective query of the corresponding plurality of queries, determining a frequency underlying data associated with the respective query changes;
   determining that the frequency the underlying data associated with a respective one of the corresponding plurality of queries changes satisfies a threshold frequency; and
   in response to determining that the frequency the underlying data associated with the respective one of the corresponding plurality of queries changes satisfies the threshold frequency, scheduling execution for the respective one of the corresponding plurality of queries at an intermediate time, the intermediate time occurring prior to the future time.

2. The method of claim 1, wherein the intermediate time comprises a point in time when additional resources of the data processing hardware are available.

3. The method of claim 1, wherein the operations further comprise, for another respective query of the corresponding plurality of queries:
   computing an estimated cost of execution of the another respective query; and
   determining that the estimated cost of execution of the another respective query satisfies a threshold cost of execution.

4. The method of claim 3, wherein the operations further comprise, in response to determining that the estimated cost of execution of the another respective query satisfies the threshold cost of execution, filtering the another respective query into a subset of queries.

5. The method of claim 3, wherein computing the estimated cost of execution comprises matching at least a portion of the respective query to an entry in a table of query fragments and historical execution times.

6. The method of claim 1, wherein the operations further comprise, for another respective query of the corresponding plurality of queries:
   determining that the frequency the underlying data associated with the another respective query changes fails to satisfy the threshold frequency; and
   in response to determining that the frequency the underlying data associated with the another respective query changes fails to satisfy the threshold frequency, scheduling the another respective query for execution at the future time.

7. The method of claim 1, wherein receiving the plurality of requests comprises receiving the corresponding plurality of queries from query clients.

8. The method of claim 7, wherein the operations further comprise returning, to one of the query clients, a corresponding result for each query of the corresponding plurality of queries.

9. The method of claim 1, wherein the operations further comprise receiving each request of the plurality of requests at a contemporaneous time.

10. The method of claim 1, wherein determining that the frequency the underlying data associated with the respective one of the corresponding plurality of queries changes satisfies the threshold frequency comprises matching a field of the respective one of the corresponding plurality of queries with a data structure indicating a known volatility of a plurality of fields.

11. A system comprising:
    data processing hardware; and
    memory hardware in communication with the data processing hardware, the memory hardware storing instructions that when executed on the data processing hardware cause the data processing hardware to perform operations comprising:
      receiving a plurality of requests to schedule execution of a corresponding plurality of queries at a future time; and
      for each respective query of the corresponding plurality of queries, determining a frequency underlying data associated with the respective query changes;
      for a respective one of the corresponding plurality of queries, determining that the frequency the underlying data associated with the respective one of the corresponding plurality of queries changes satisfies a threshold frequency; and
      in response to determining that the frequency the underlying data associated with the respective one of the corresponding plurality of queries changes satisfies the threshold frequency, scheduling the respective one of the corresponding plurality of queries for execution at an intermediate time, the intermediate time occurring prior to the future time.

12. The system of claim 11, wherein the intermediate time comprises a point in time when additional resources of the data processing hardware are available.

13. The system of claim 11, wherein the operations further comprise, for another respective query of the corresponding plurality of queries:
    computing an estimated cost of execution of the another respective query; and
    determining that the estimated cost of execution of the another respective query satisfies a threshold cost of execution.

14. The system of claim 13, wherein the operations further comprise, in response to determining that the estimated cost of execution of the another respective query satisfies the threshold cost of execution, filtering the another respective query into a subset of queries.

15. The system of claim 13, wherein computing the estimated cost of execution comprises matching at least a portion of the respective query to an entry in a table of query fragments and historical execution times.

16. The system of claim 11, wherein the operations further comprise, for another respective query of the corresponding plurality of queries:
    determining that the frequency the underlying data associated with the another respective query changes fails to satisfy the threshold frequency; and
    in response to determining that the frequency the underlying data associated with the another respective query changes fails to satisfy the threshold frequency, scheduling the another respective query for execution at the future time.

17. The system of claim 11, wherein receiving the plurality of requests comprises receiving the corresponding plurality of queries from query clients.

18. The system of claim 17, wherein the operations further comprise returning, to one of the query clients, a corresponding result for each query of the corresponding plurality of queries.

19. The system of claim 11, wherein the operations further comprise receiving each request of the plurality of requests at a contemporaneous time.

20. The system of claim 11, wherein determining that the frequency the underlying data associated with the respective one of the corresponding plurality of queries changes satisfies the threshold frequency comprises matching a field of the respective one of the corresponding plurality of queries with a data structure indicating a known volatility of a plurality of fields.

* * * * *